United States Patent [19]

Okabayashi et al.

[11] Patent Number: 4,902,082
[45] Date of Patent: Feb. 20, 1990

[54] PROJECTOR DEVICE FOR VEHICULAR DISPLAY

[75] Inventors: Shigeru Okabayashi; Junichi Fukano, both of Yokohama, Japan

[73] Assignee: Nissan Motor Co., Ltd., Japan

[21] Appl. No.: 880,034

[22] Filed: Jun. 30, 1986

[30] Foreign Application Priority Data

Jul. 1, 1985 [JP] Japan .................. 60-142434

[51] Int. Cl.⁴ .......................... G02B 5/32; G03H 1/22
[52] U.S. Cl. .................... 350/3.7; 350/3.86; 350/344; 350/174
[58] Field of Search ............. 350/3.6, 358, 3.7, 3.67, 350/3.68, 3.85, 174, 3.84, 3.86

[56] References Cited

U.S. PATENT DOCUMENTS 3,548,643 12/1970 Leith et al. .
3,645,129 1/1972 Grant ........................ 73/67
4,309,070 1/1982 St. Leger Searle ............ 350/3.7
4,408,881 10/1983 Clarady, Jr. et al. .......... 356/347
4,655,540 4/1987 Wood et al. ................. 350/3.7

FOREIGN PATENT DOCUMENTS 57-182541 11/1982 Japan .
58-180522 12/1983 Japan .
59-7428 1/1984 Japan .

*Primary Examiner*—Bruce Y. Arnold
*Attorney, Agent, or Firm*—Leydig, Voit & Mayer

[57] ABSTRACT

A head-up display system employs a transparent hologram built into the vehicular windshield. A scanning beam is used to scan the hologram, and its luminosity is turned on and off to illuminate points making up images. Such head-up display system is compact enough to enable practical installation on a vehicle.

12 Claims, 3 Drawing Sheets

PROJECTOR DEVICE FOR VEHICULAR DISPLAY

BACKGROUND OF THE INVENTION

The present invention relates generally to a display device for an automotive vehicle for displaying vehicular driving information, such as vehicle speed, engine speed, fuel supply, engine coolant temperature and so forth. More specifically, the invention relates to a compact projector device which is designed for use in a so-called "head-up display" which projects vehicle driving information onto the front windshield.

Conventionally, vehicular instruments, such as speedometers, trip meters, odometers, fuel gauges, temperature meters, clocks and so forth, have been arranged on an instrument panel. This arrangement of instruments has forced the driver to look down and/or away from the road to obtain necessary driving information. This incurs an interruption in the observation of the surrounding terrain and traffic.

In order to improve this, there has been a so-called "head-up display" has been proposed which focuses images of a speedometer, a trip meter, an odometer, a fuel gauge, a temperature meter, a clock and so forth to overlap the forward field of vision through the windshield. This display system is disclosed in Japanese Patent First Publication (Tokkai) Showa No. 57-182541. The display system employs a cathode-ray tube (CRT) as a source of display images. The CRT is rather bulky due largely to its thickness. Furthermore, in order to improve the legibility and sharpness of the projected image, a rather high luminosity is needed, which further adds to its bulk. A bulky CRT is difficult to install within the instrument panel.

The head-up display system further requires an optical system for focussing the display image onto the front windshield. Relatively thick and bulky lenses must be used in the optical system. This bulky optical system again limits where the head-up display system can be installed due to its weight and bulk.

Improved head-up display systems proposed in Japanese Utility Model First Publication (Jikkais) Showa Nos. 58-180522 and 59-7428 help alleviate these difficulties with the prior art. These systems employ holograms as combiners. However, since such systems still require CRT's and optical systems, they cannot completely solve the aforementioned problems.

Because of the problems in the prior proposed systems, there is no head-up display system which can be installed practically in a commercially available vehicle.

SUMMARY OF THE INVENTION

Therefore, it is an object of the present invention to provide a compact head-up display system which enables practical installation on a vehicle.

Another object of the invention is to provide a projector device for a head-up display system which makes the head-up display system compact enough for practical installation in the vehicle.

In order to accomplish the aforementioned and other objects, a head-up display system, according to the present invention, employs a transparent hologram built into the vehicular windshield. A scanning beam is used to scan the hologram, and its luminosity is turned on and off to illuminate points making up images.

According to one aspect of the invention, a display system comprises a hologram of a substantially flat surface, a reference beam source for generating a reference beam covering the hologram, a laser beam source for generating a scanning beam which irradiates the hologram at selected points in the presence of the reference beam so as to make the selected points of the hologram visible, scanning means for scanning the scanning beam across the hologram according to a predetermined pattern, and a display controller associated with the scanning means for deriving a display image to be formed and controlling the instantaneous intensity of the latter, and by turning the laser beam source on and off so as to irradiate points of the hologram making up the image to be displayed.

The hologram is prepared by irradiating a substantially flat surface opposing a photo-sensitive medium and the medium itself with coherent light beams. The coherent light beam irradiating the medium during formation of the hologram has a given angle of divergence matching the angle of divergence of the reference beam. The reference beam irradiating the hologram during reproduction of the display image has an angle incidence matching the angle of incidence of the coherent light beam irradiating the medium during formation of the hologram.

The display controller is connected to a sensor monitoring vehicle operating conditions and derives the display image to be representative of vehicle information related to the vehicle operating conditions.

In practice, the hologram is essentially transparent when not irradiated by both the reference beam and the scanning beam. The hologram is in the form of a layer in intimate contact with and supported by a pane of glazing.

DESCRIPTION OF THE PREFERRED EMBODIMENT

Basically, the preferred embodiment of a head-up display system according to the present invention employs a hologram to display desired images of standard vehicle instrument readings such as vehicle speed, engine revolution speed, engine coolant temperature or engine temperature, remaining fuel supply and so forth, in a predetermined arrangement. The hologram is preferably built into the front windshield of the vehicle. A scanning beam irradiates the hologram to generate information display images within the forward field of view of the driver.

The scanning beam is controlled by means of a controller in accordance with the kinds of vehicle information to be displayed. The scanning beam scans the entire surface of the hologram according to a predetermined scanning pattern and turns on at sections at which display images are to be generated.

Figure 1:
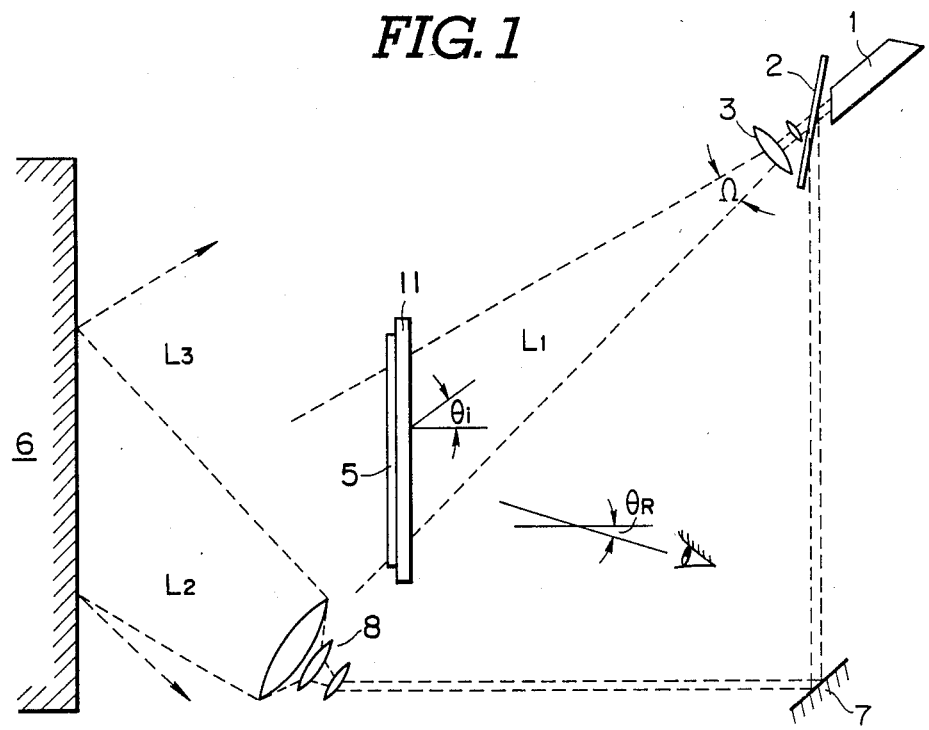
FIG. 1 is a diagram showing how a holographic substrate is prepared for use in the preferred embodiment of a head-up display system according to the invention.

FIG. 1 is a diagram illustrating how a finished holographic substrate 10 (see FIG. 2) is fabricated. It should be noted that the preferred embodiment of the head-up display system, according to the present invention, employs a Lippman hologram. First, a photo-sensitive layer of dichromate gelatin 5 is deposited on the front of a glass sheet 11 which will be assembled to form a windshield 4. The resulting assembly 11, 5 is placed a desired distance in front of a flat surface 6. Preferably, the dichromate gelatin layer 5 lies parallel to the flat surface 6 at a distance of about 1.5 m.

An argon laser 1 is employed as a laser beam source. The argon laser 1 opposes a beam splitter 2 which splits the laser beam from the argon laser 1 into two beam components. One of the laser beam components passes through a beam expander lens 3 which induces that laser beam component to diverge at an angle $\Omega$. The argon laser 1, the beam splitter 2 and the beam expander lens 3 are arranged so that the beam axis of the laser beam component passing through the beam expander lens impinges at an angle $\theta_1$ on the surface of the front windshield 4 opposite that on which the dichromate gelatin layer 5 is formed. The laser beam component passing through the beam expander lens 3 serves as a reference beam $L_1$.

The other laser beam component separated by the beam splitter 2 is deflected by a deflector mirror 7 to a lens system 8. The lens system 8 puts out an irradiation beam $L_2$ directed toward the flat surface 6. The irradiation beam $L_2$ illuminating the flat surface 6 is reflected to form a reflected beam $L_3$.

The lens system 8 is so arranged that the beam axis of the reflected beam $L_3$ from the flat surface has a known angle of incidence $\theta_R$ on the dichromate gelatin layer 5.

The reference beam $L_1$ and the reflected beam $L_3$ from opposite sides of the dichromate gelatin layer 5 interfere within the dichromate gelatin layer to form interference fringes with in the layer. This means that a holographic image of the flat surface 6 is recorded in the dichromate gelatin layer 5, which hereafter will be referred to as hologram 10.

Figure 2:
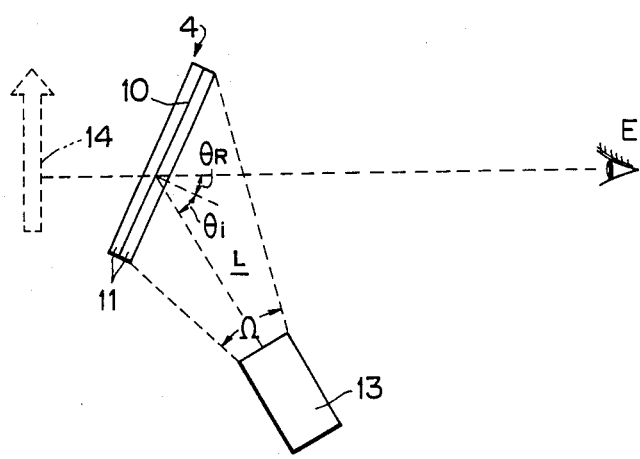
FIG. 2 is a diagram showing how a hologram can be projected onto a windshield in the preferred embodiment of the head-up display system according to the invention.

FIG. 2 shows how a holographic image having a desired pattern is created for visual display. In the practice, the hologram 10 is sandwiched between a pair of transparent panes of glass 11 which form the front windshield 4. A laser beam scanner 13 opposes the hologram 10 and scans a laser beam L with an angle of divergence $\Omega$ thereacross. The laser beam L serves as a reference beam and is arranged to have an angle of incidence $\theta_i$ which corresponds to the angle of incidence $\theta_i$ of the reference beam $L_1$ used to make the hologram 10.

The hologram 10 is positioned so that the driver's optical axis E lies in the plane of reflection of the axis of the reference beam L ($\theta_i = \theta_R$ in FIG. 2).

The laser beam scanner 13 also generates a scanning beam B (FIG. 3) which is tightly collimated. When a point on the hologram 10 is simultaneously irradiated by the reference beam L and the scanning beam B, a spot-like holographic image is produced due to interference between the two beams L and B. Each spot-like holographic image is visible along the driver's optical axis E. These spot-like holographic images are analogous to the pixels of a television image. By creating a plurality of these spot-like holographic images in suitable locations in the field of view of the driver, any desired pattern, which is a composite of the spot-like holographic images, can be created. Therefore, by scanning the scanning beam B across the hologram 10 according to a predetermined scanning pattern, visual images relating vehicle information can be formed. In practice, the scanning beam B scans along the x- and y-axes of the hologram. The scanning beam B is switched ON and OFF at predetermined points by a scanning control circuit to form visual images conveying vehicle information.

In the shown embodiment, a virtual image is generate in a focal plane about 1.5 m in front of the windshield.

As will be appreciated herefrom, a vehicle information display can be obtained by scanning the scanning beam B across the hologram while switching the scanning beam B ON and OFF at points making up the image or images representative of the vehicle speed, engine speed, engine temperature, fuel supply, battery voltage and so forth.

Figure 3:
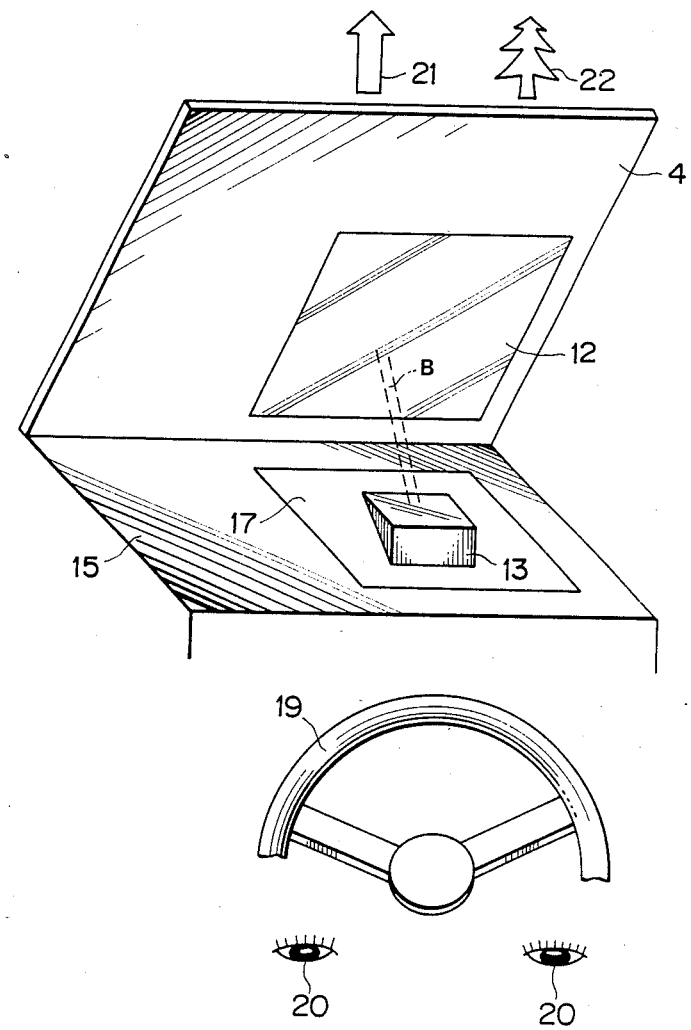
FIG. 3 is a diagram of major parts of a vehicle involved in the operation of the preferred embodiment of the head-up display system.

FIG. 3 shows an example of a practical application of the preferred embodiment of the head-up display system according to the invention. As shown in FIG. 3, the hologram 10 is disposed within the front windshield 4 at a position opposite the driver. As before, the laser beam scanner 13 opposes the hologram 10. Since the laser beam scanner 13 can be made into a compact assembly, it can be easily installed in the instrument panel 15 or in an over-head console (not shown). A filter 17 may be interposed between the laser beam scanner 13 and the hologram 10.

In FIG. 3, the reference numeral 19 denotes a steering wheel of the vehicle and numerals 20 denote the driver's eyes.

With this arrangement, the laser beam scanner 13 generates a display image 21 in front of the windshield 4 overlapping the forward field of view 22 according to the vehicle information to be displayed.

Figure 4:
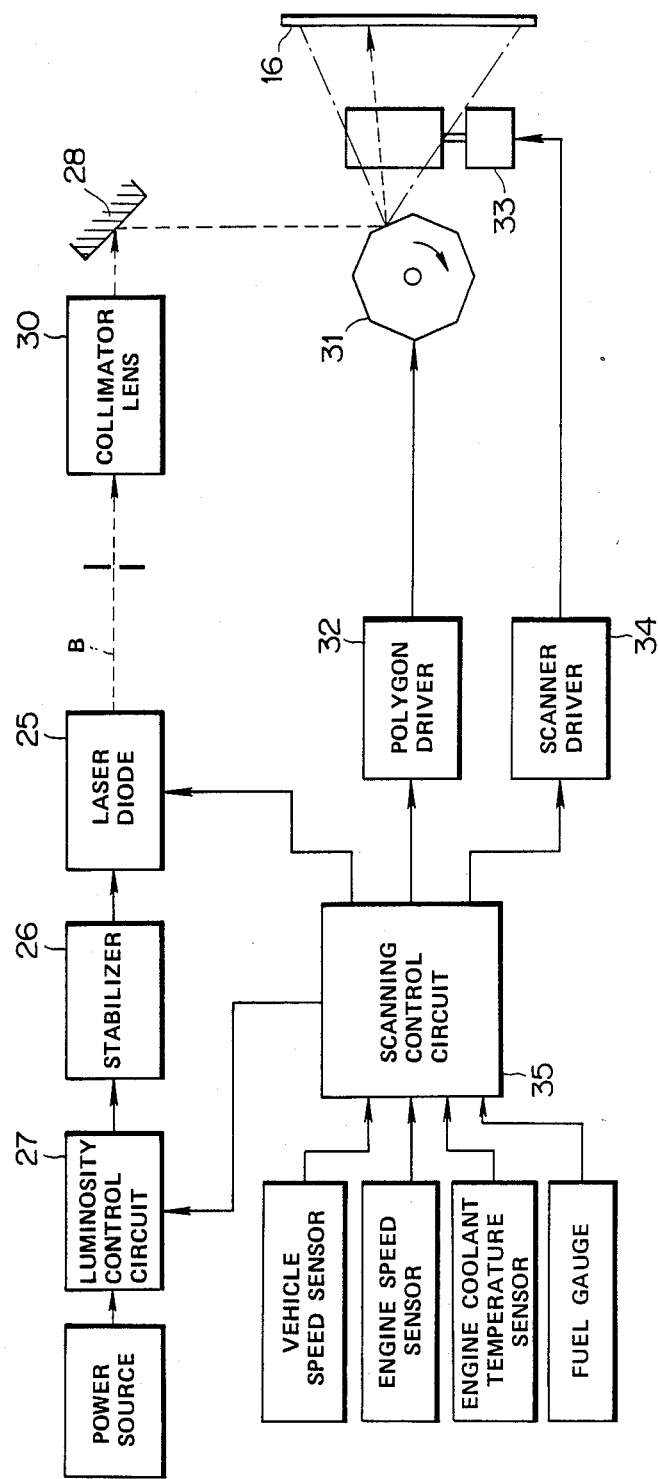
FIG. 4 is a block diagram of a scanning control circuit for a scanning laser beam.

FIG. 4 is a block diagram of the laser beam scanner 13 employed in the preferred embodiment of the head-up display system according to the invention. The laser beam scanner 13 comprises a laser diode 25 serving as the source of the scanning beam B. The laser diode 25 is connected to a power source 29 through a luminosity control circuit 27 and a stabilizer 26. The luminosity control circuit 27 adjusts the electric power which is supplied to the laser diode 25 so as to adjust the luminosity of the scanning beam B. The laser diode 25 transmits the scanning beam B to a deflector 28 through a collimator lens 30. The deflector 28 deflects the scanning beam B by about 90° toward a polygonal deflector 31. The polygonal deflector 31 rotates ar high speed to scan the scanning beam in the x-direction. The polygonal deflector 31 is connected to a polygon driver 32 which controls scanning speed and scanning direction. A oscillation scanner 33 is interposed between the polygon deflector 31 and the hologram 10. The oscillation scanner 33 is a device which deflects the scanning beam B from the polygonal deflector 31. It is controlled by a scanner driver 34 so as to make the scanning beam B scan in the y-direction.

An acousto-optic modulator can be employed as a replacement for the polygon deflector for acousto-optically deflecting the laser beam.

The luminosity control circuit 27, the laser diode 25, the polygon driver 32 and the scanner driver 34 are connected for input from a scanning control circuit 35 which comprises a microprocessor. The scanning control circuit 35 is in turn connected for input from a vehicle speed sensor 40, an engine speed sensor 41 which may comprise a crank angle sensor, an engine coolant temperature sensor 42, a fuel gauge 43 and so forth. Based on the sensor signals from the associated sensors as set forth above, the scanning control circuit 35 derives a display image pattern and thus derives control signals for each of the luminosity control circuit 27, the laser diode 25, the polygon driver 32 and the scanner driver 34. The control signal for the laser diode 25 is a modulated binary signal modulated by display data, such as vehicle speed, engine speed, engine coolant temperature, fuel supply and so forth. The control signal turns the laser diode 25 ON at scanning points making up images to be displayed. Furthermore, the scanning position of the laser beam B is controlled by the control signals produced by the scanning control circuit 35 and sent to the polygon driver 32 and the scanner driver 34. The control signal sent to the luminosity control circuit 27 adjusts the power supply to the laser diode and thereby adjusts the luminosity of the display image.

The overall system can be made to be very compact. For example, the diameter of the laser diode 25 can be less than 1 mm, and the collimator lens 30 can be approximately 5 mm in diameter.

Preferably, the scanning control circuit 35 may be connected to a manual switch allowing adjustment of the luminosity of the display image and adjusts the luminosity according to manual input through the manual switch.

As will be appreciated herefrom, the present invention provides a head-up display system for displaying vehicle information which is compact enough for application to automotive vehicles. Furthermore, by utilizing the hologram as a medium of display image, which allows the use of a greater display area than conventional CRT-type displays, differences in height of the optical axes of various drivers will not affect the legibility of the display.

Although the foregoing disclosure is specifically directed to display of vehicle information such as vehicle speed, engine speed, and so forth, it would be possible to utilize the display system according to the present invention to display air conditioner operating mode, arrows indicating direction in navigation systems, audio information and so forth.

What is claimed is:

1. A display system comprising:
   a hologram of a substantially flat surface;
   a reference beam source generating a coherent reference beam which irradiates the entire surface of said hologram;
   a scanning beam source generating a coherent scanning beam having a different degree of collimation from the reference beam so as to interfere therewith;
   scanning means for scanning the scanning beam across said hologram according to a predetermined pattern; and
   a display controller for deriving a display image to be formed and turning the scanning beam source on and off so as to irradiate only a plurality of selected points on the surface of said hologram with said scanning beam which are simultaneously irradiated by the reference beam, said selected points cumulatively forming a pattern having the same shape as the display image derived by said display controller.

2. A display system as set forth in claim 1, wherein said hologram is formed by irradiating a substantially flat surface opposing a photo-sensitive medium and said medium itself with coherent light beams.

3. A display system as set forth in claim 2, wherein a coherent light beam irradiating the medium during formation of the hologram has a given angle of divergence matching the angle of divergence of the reference beam.

4. A display system as set forth in claim 2, wherein the reference beam covering the hologram during reproduction of the display image has an angle of incidence matching the angle of incidence of the coherent reference light beam irradiating the medium during formation of the hologram.

5. A display system as set forth in claim 4, wherein said display controller is connected to a sensor monitoring vehicle operating conditions and derives said display image to be representative of vehicle information related to the vehicle operating conditions.

6. A display system as set forth in claim 1, wherein said hologram is essentially transparent when not irradiated by both the reference beam and said scanning beam.

7. A display system as set forth in claim 6, wherein said hologram is in the form of a layer in intimate contact with and supported by a pane of glazing.

8. A display system comprising:
   a hologram of a substantially flat surface;
   a first laser beam source that generates a first laser beam that irradiates the entire surface of said hologram;
   a second laser beam source that generates a second laser beam that irradiates a plurality of specific points on the surface of said hologram which are simultaneously irradiated by said first laser beam, said second laser beam having a different degree of collimation from said first laser beam so as to create interference with said first laser beam, said plurality of specific points together forming a pattern;
   scanning means for scanning said second laser beam over the entire surface of said hologram; and
   means for turning said second laser beam on and off as said second laser beam is scanned by said scanning means, whereby said specific points are irradiated sequentially.

9. A display system as claimed in claim 8 wherein said first laser beam has a greater angle of divergence than said second laser beam.

10. A method of creating a holographic display comprising:
    irradiating the entire surface of a hologram of a substantially flat surface with a first laser beam; and
    irradiating a plurality of specific points on the surface of said hologram with a second laser beam at the same time that said specific points are irradiated with said first laser beam by scanning said second laser beam over the surface of said hologram and turning said second laser beam on only when it is directed at one of said specific points, said first and second laser beams having different degrees of collimation so as to cause mutual interference, said plurality of points together defining a desired pattern.

11. A method as claimed in claim 10 wherein:
    irradiating said hologram by said first laser beam comprises scanning said first laser beam over the surface of said hologram.

12. A method as claimed in claim 10, wherein said first laser beam has a greater angle of divergence than said second laser beam.

* * * * *